United States Patent [19]
Elston, III et al.

[11] Patent Number: 5,263,898
[45] Date of Patent: Nov. 23, 1993

[54] PROPELLER BLADE RETENTION SYSTEM

[75] Inventors: Sidney B. Elston, III, Marblehead; Victor H. Simon, III, N. Andover, both of Mass.; Wu-Yang Tseng, West Chester; Lawrence Butler, Cincinnati, both of Ohio

[73] Assignee: General Electric Company, Cincinnati, Ohio

[21] Appl. No.: 798,986

[22] Filed: Dec. 2, 1991

Related U.S. Application Data

[63] Continuation of Ser. No. 731,293, Jul. 16, 1991, abandoned, which is a continuation of Ser. No. 284,201, Dec. 14, 1988, abandoned.

[51] Int. Cl.⁵ .................................................. F01D 7/00
[52] U.S. Cl. ...................................... 416/147; 416/129
[58] Field of Search ........... 416/128, 129, 135, 157 B, 416/206, 221, 147, 153

[56] References Cited

U.S. PATENT DOCUMENTS

| | | | |
|---|---|---|---|
| 1,927,592 | 9/1933 | Lambert | 416/147 |
| 2,381,284 | 8/1945 | Heath | 416/209 |
| 2,468,004 | 4/1949 | Walker | 416/61 |
| 2,846,183 | 8/1958 | Morgan | 416/206 |
| 3,459,267 | 8/1969 | Chilman | 416/205 X |
| 3,467,198 | 9/1969 | Ellinger | 416/2 |
| 3,549,272 | 12/1970 | Bauger et al. | 416/127 X |
| 3,799,698 | 3/1974 | Haworth | 416/204 |
| 4,022,545 | 5/1977 | Shank | 415/135 |
| 4,470,757 | 9/1984 | Vollinger | 416/221 |
| 4,591,313 | 5/1986 | Miyatake et al. | 416/129 |
| 4,738,590 | 4/1988 | Butler | 416/129 |
| 4,738,591 | 4/1988 | Butler | 416/129 |
| 4,762,466 | 8/1988 | Bouiller et al. | 416/205 |
| 4,817,382 | 4/1989 | Rudolph et al. | 416/171 X |
| 4,863,352 | 9/1989 | Hauser et al. | 416/204 R |

FOREIGN PATENT DOCUMENTS

| | | | |
|---|---|---|---|
| 718786 | 1/1932 | France | 416/147 |
| 485978 | 5/1938 | United Kingdom | 416/147 |
| 637238 | 5/1950 | United Kingdom | 416/205 |
| 1196589 | 7/1970 | United Kingdom | 416/166 |
| 2174762 | 11/1986 | United Kingdom | 416/147 |
| 2192943 | 1/1988 | United Kingdom | 416/147 |

*Primary Examiner*—John T. Kwon
*Attorney, Agent, or Firm*—Jerome C. Squillaro; John R. Rafter

[57] ABSTRACT

The invention concerns the mounting of propeller blades to a ring-shaped rotor. The blades are of the variable pitch type, and the shank of each blade extends through a respective hole in the rotor. Each hole contains an annular shelf which is fastened to the wall of the hole and surrounds each shank. Each shank bears a pair of bearing races which sandwich the annular shelf in order to connect the blade to the rotor. Bearing rollers are positioned between the annular shelf and the bearing races.

2 Claims, 8 Drawing Sheets

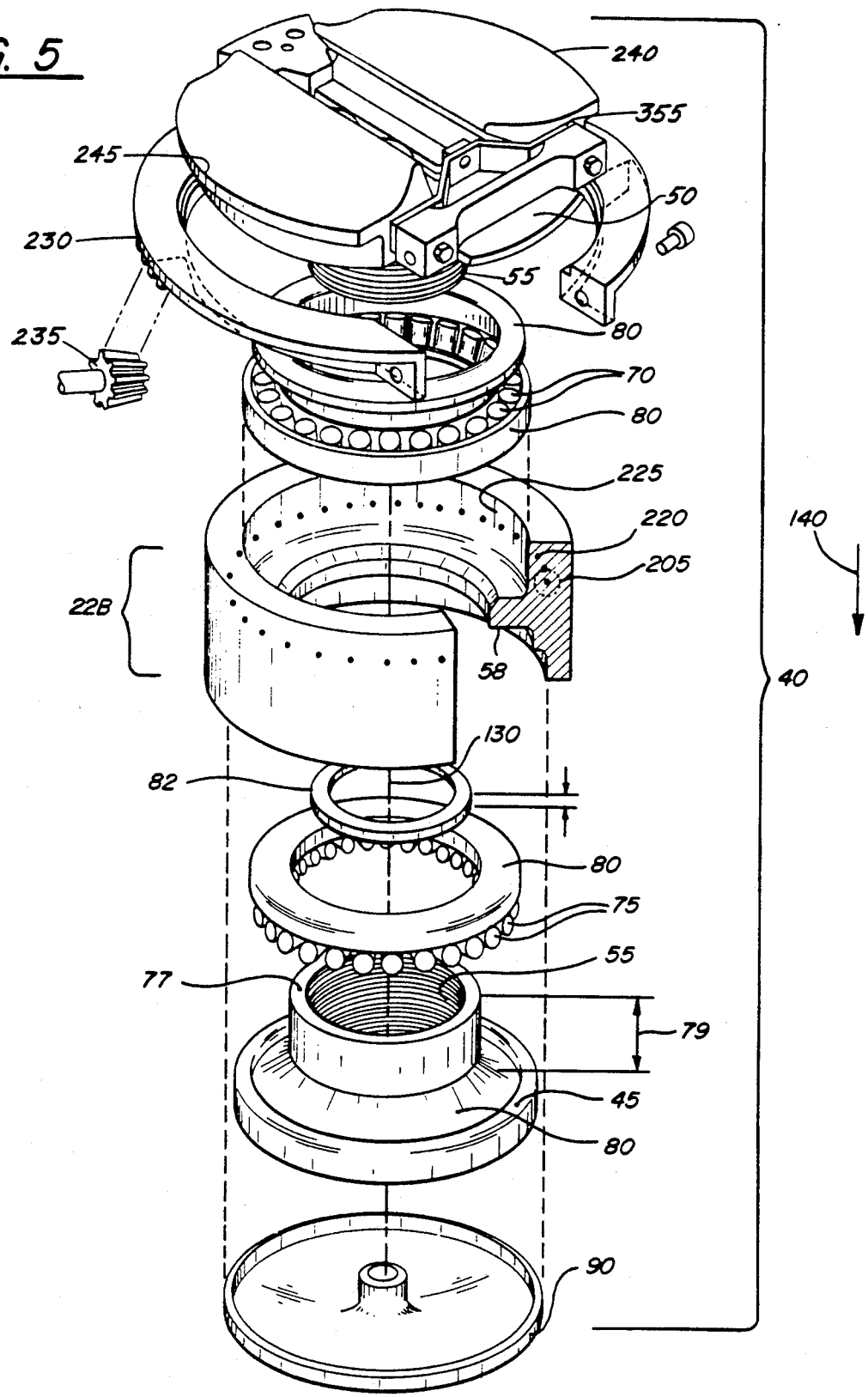

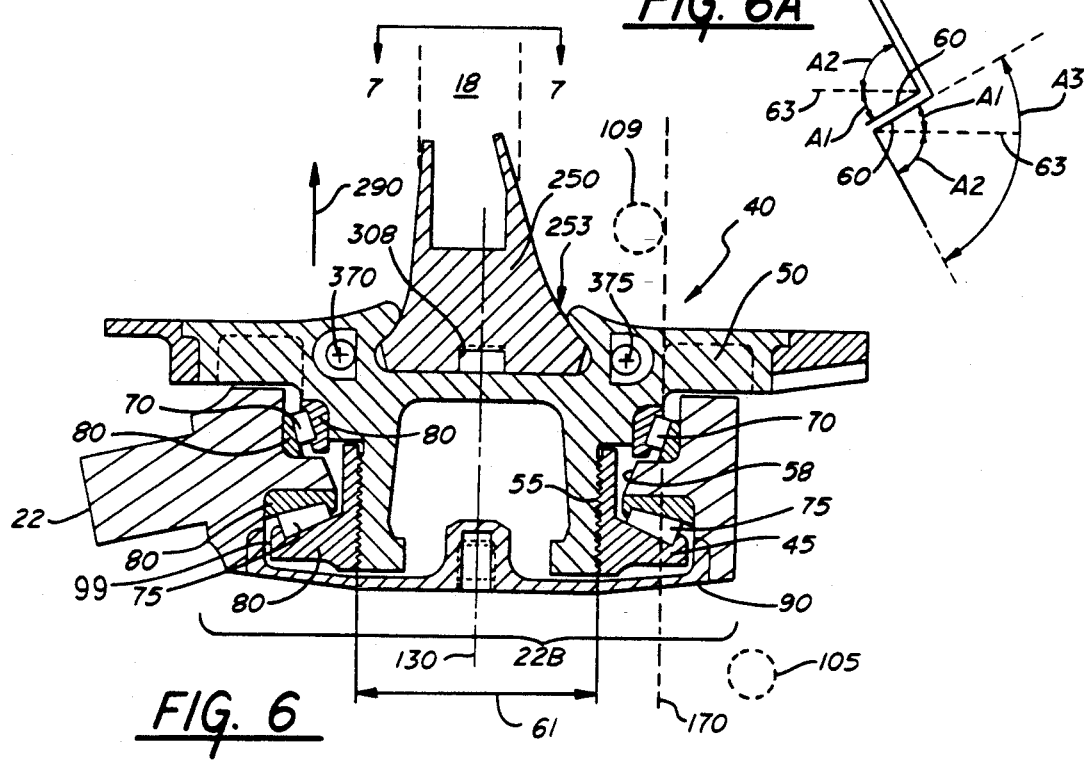
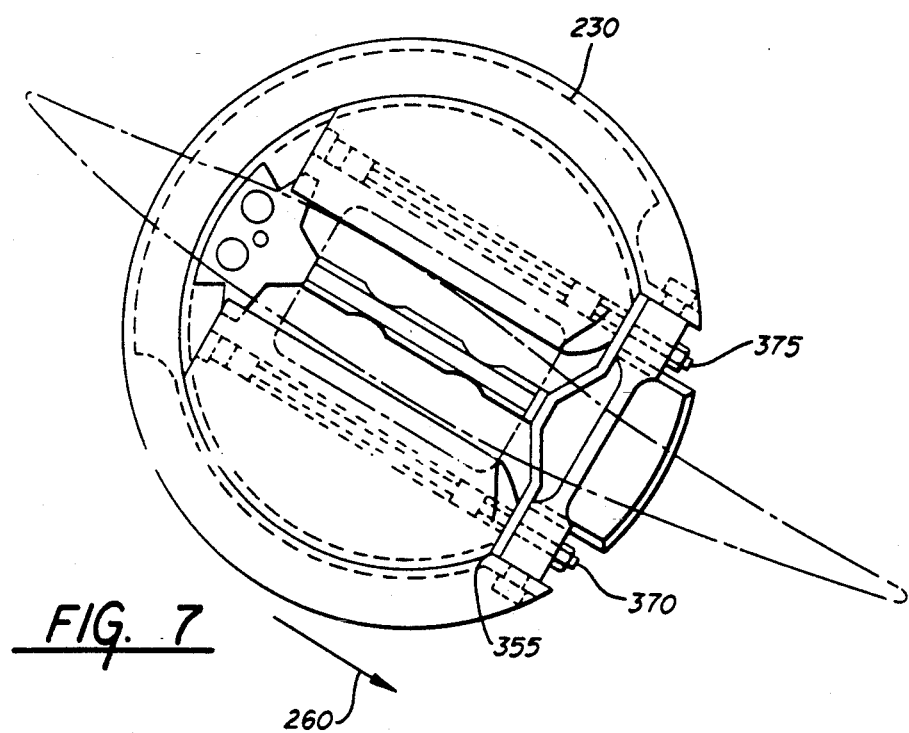

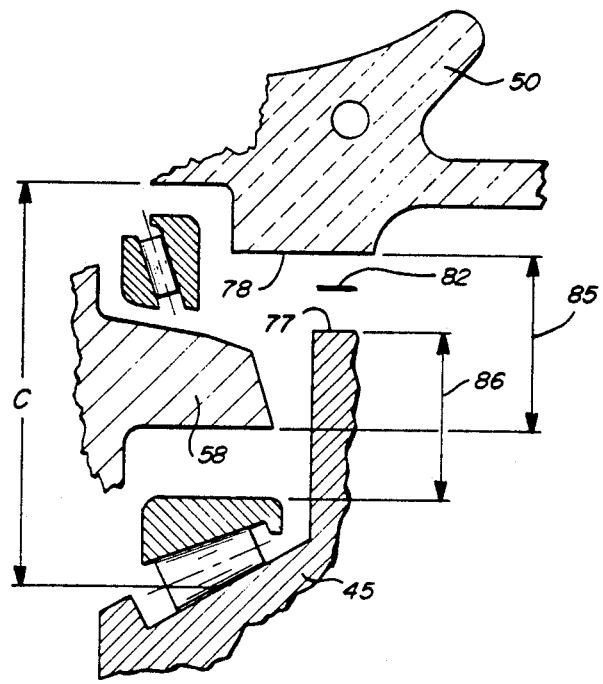
FIG. 12A
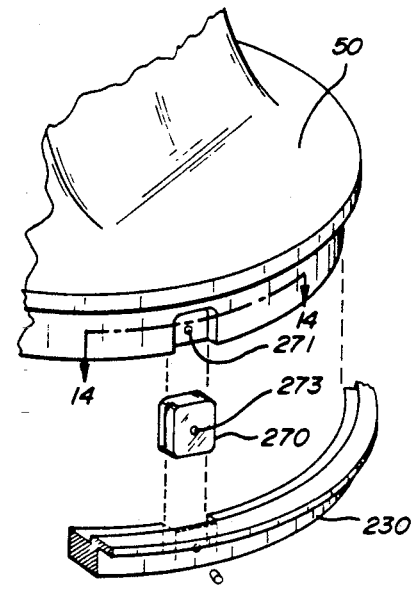
FIG. 13
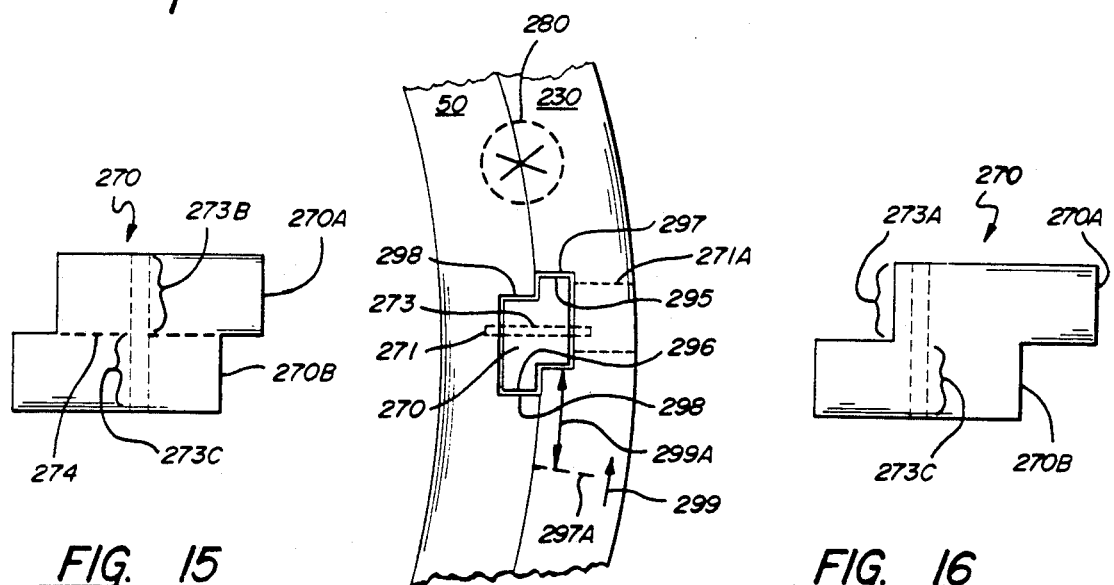
FIG. 15
FIG. 14
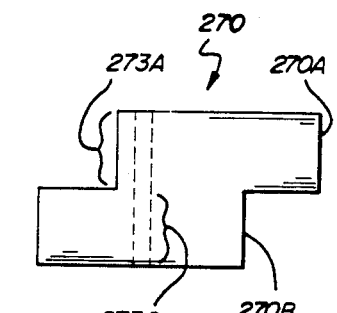
FIG. 16

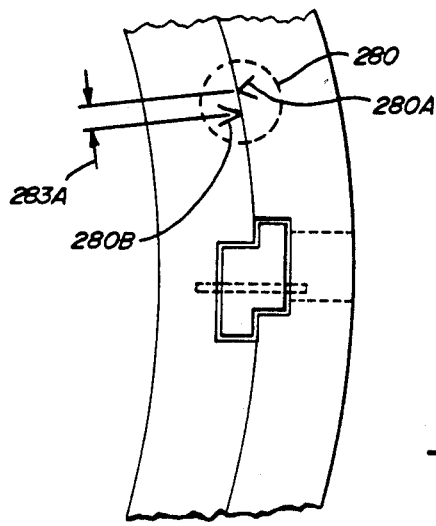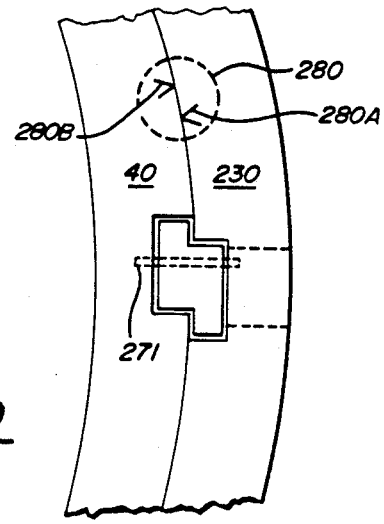
FIG. 17　FIG. 19
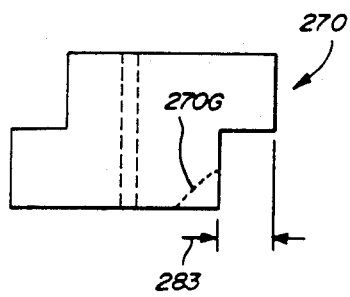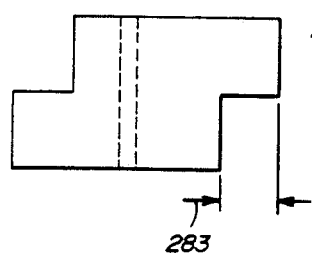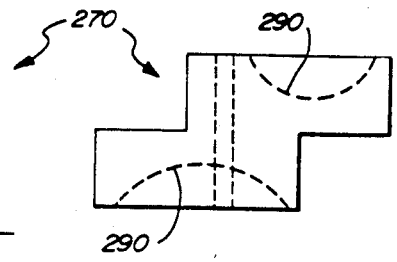
FIG. 18A　FIG. 18B　FIG. 18C
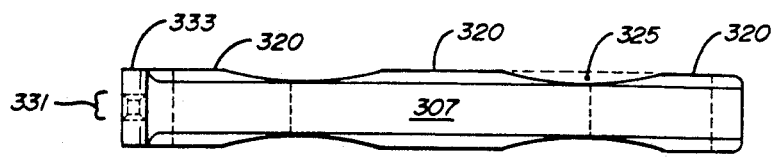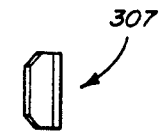
FIG. 20A　FIG. 20C
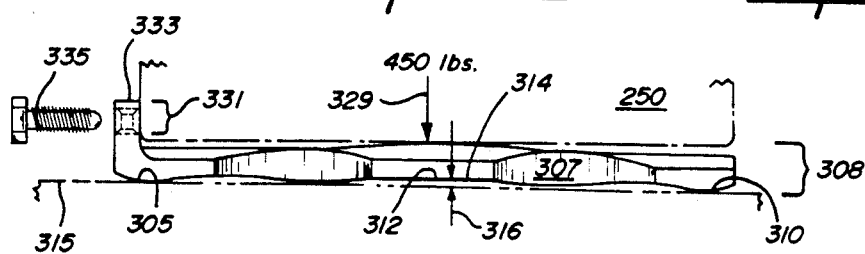
FIG. 20B

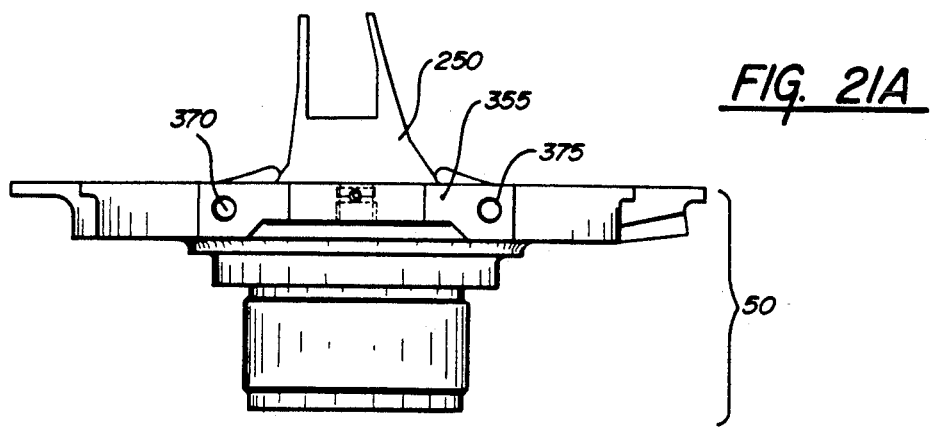
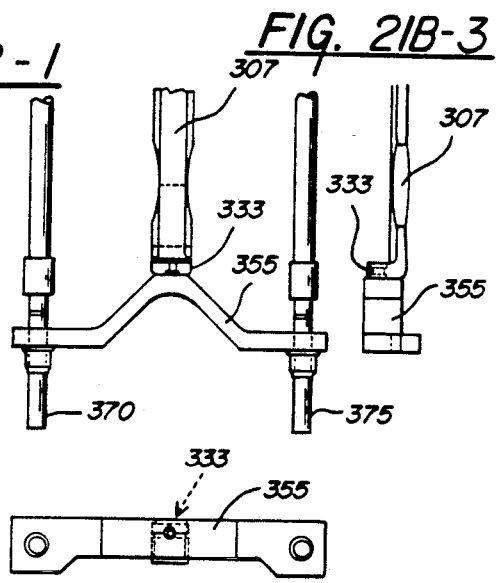
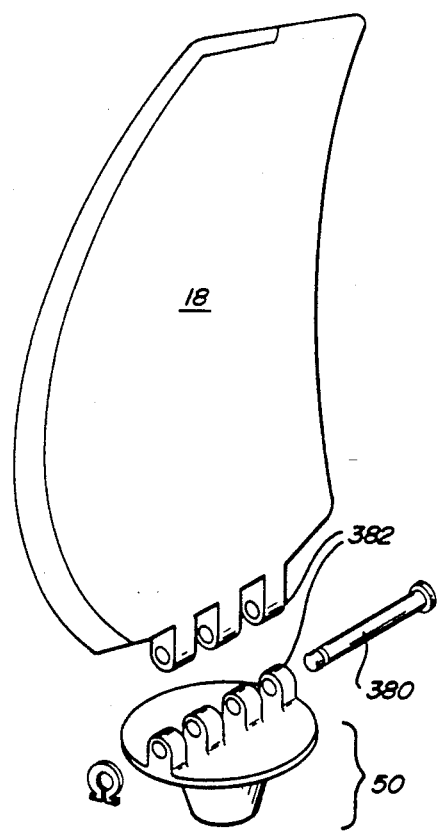
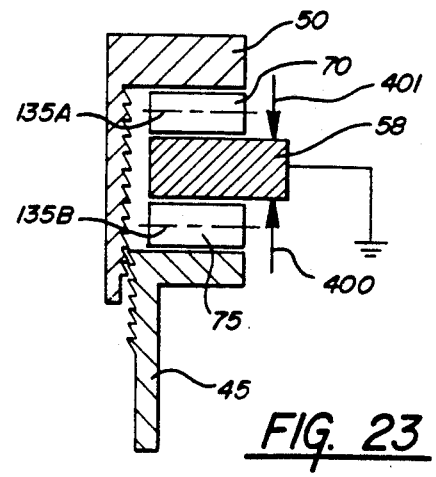

PROPELLER BLADE RETENTION SYSTEM

The invention herein described was made in the performance of work under a NASA contract and is subject to the provisions of Section 305 of the National Aeronautics and Space Act of 1958, Public Law 85-568 (72 Stat. 435; 42 USC 2457).

This application is a continuation of application Ser. No. 07/731,293 filed Jul. 16, 1991, now abandoned, which application is a continuation of application Ser. No. 07/284,201 filed Dec. 14, 1988, now abandoned.

The invention relates to the mounting of propeller blades in aircraft engines and, more specifically, to a mounting system in a contra-rotating propeller pair in which propeller blades are supported by a ring. The centrifugal load of the propeller blades is distributed as hoop stress in the ring, and the ring is supported by a turbine which the ring surrounds. The invention concerns mounting the blades to the ring such that they can change in pitch.

BACKGROUND OF THE INVENTION

FIG. 1 illustrates an aircraft engine 3 of the unducted fan type, in which the invention can be used. Region 6 of the engine is shown in cross-sectional schematic form in FIG. 2, wherein contra-rotating turbines 9 (decorated with wide hatching) and 12 (narrow hatching) are driven by a hot gas stream 15 provided by a gas generator (not shown). The turbines 9 and 12, in turn, drive contra-rotating fan blades 18 and 21 shown in FIGS. 1 and 2. (The term "contra-rotating" means that turbines 9 and 12, as well as blades 18 and 21 to which they are attached, rotate in opposite directions, as shown by arrows 24 and 27 in FIG. 1.) A view of sub-region 6A in FIG. 2 is shown in perspective form in FIG. 4. In FIG. 4, annulus 29 represents turbine blades 30 in FIG. 2.

The fan blades 18 in FIG. 2 are supported by a polygonal ring 22 in FIG. 4. One type of polygonal ring is described in the U.S. Pat. No. 4,863,352 entitled "Blade Carrying Means", filed by Hauser, Strock, Morris and Wakeman on Nov. 2, 1984. This patent is hereby incorporated by reference.

A cross section 23A of the ring is shown in FIG. 2. The ring 22 is connected to the turbine casing 9A in FIGS. 2 and 4 by schematic brackets 24A in FIG. 2. The ring 22 supports a rotating cowling 28, also shown in FIG. 1, by schematic brackets 25.

The polygonal ring 22 in FIG. 4 includes two types of sections: one type is a blade support section 22B, also shown in FIG. 3, which includes bearings 22D which facilitate pitch change, indicated by arrow 39, of the fan blades 18. The other type of section is a connector section 22A in FIG. 4, including a pair of slender beams 23, which connects neighboring blade support sections 22B.

The fan blades 18 are fastened to the polygonal ring 22 rather than directly to the casing 9A for three principal reasons. One, it is doubtful that a turbine casing 9A of customary design could withstand the centrifugal force applied by the fan blades 18 during operation. Two, different design considerations govern the size and shape of the fan system 33 in FIG. 2 as compared with the turbine system 34. Consequently, it is not expected that the turbine casing 9A would be of a proper shape and location for mounting of the fan blades 18. Three, the casing 9A experiences wide temperature excursions, and it is preferable to avoid mounting the fan blades to a structure of widely variable temperature.

In addition, the engine 3 shown in FIG. 1 can be in the thrust class of 30,000 pounds, which causes a high loading in the fan blades 18. For example, assuming that a total of sixteen fan blades are used on the engine (eight forward blades 18 and eight aft blades 21), then, as a rough approximation, the thrust force of 30,000 pounds, indicated by arrow 35, is shared equally by these sixteen blades: each blade accounts for about 1875 pounds of thrust. If it is assumed that each blade in FIG. 4 is four feet long (dimension 37), and if it is further assumed that the thrust load is concentrated at the midpoint 40 of each blade, then a moment of 1875×2, or 3750 foot-pounds must be reacted by each mounting apparatus shown in FIG. 3. Further, this moment is not static, but changes as pitch changes, which is indicated by curved arrow 39 in FIG. 3.

OBJECTS OF THE INVENTION

It is an object of the invention to provide a rotatable mount for mounting an aircraft fan blade to a rotor.

It is a further object of the invention to provide a rotatable mount for mounting a highly loaded aircraft fan blade to a rotor.

SUMMARY OF THE INVENTION

In one form of the invention, a plurality of propeller blades are carried by a ring. Each blade is supported by a trunnion which rides in a hole in the ring. The trunnion rides on two sets of bearings, one of which reacts centrifugal load, and both of which react moment loads, such as aerodynamic loads.

BRIEF DESCRIPTION OF THE DRAWINGS

FIG. 5 illustrates, in exploded view, one form of the invention.

FIG. 6 illustrates, in cross-section, the form of the invention of FIG. 5.

FIG. 6A illustrates threads 55 of FIG. 6.

FIG. 7 is a view, in the direction of arrows 7—7, of the form of the invention of FIG. 6.

FIG. 12A is an exploded view of region 87 in FIG. 10.

FIG. 13 illustrates a key 270 used to fasten a bevel ring gear 230 to the trunnion part 40.

FIG. 14 illustrates a view of FIG. 13, taken along arrows 14—14, but with the key 270 in FIG. 14 replaced by that of FIG. 15.

FIGS. 15 and 16 illustrate another type of key which provides the function of key 270 in FIG. 13.

FIG. 17 is similar to FIG. 14, but showing displacement of the bevel ring gear with respect to the trunnion.

FIG. 18A illustrates a first configuration of a key for aligning the gear and trunion in a specified relation.

FIG. 18B illustrates a second configuration of a key for aligning the gear and trunion in a specified relation.

FIG. 18C illustrates a third configuration of a key for aligning the gear and trunion in a specified relation.

FIG. 19 shows displacement of the type shown in FIG. 17, but in the opposite direction.

FIGS. 20A, 20B, and 20C illustrate a spring used to reduce rocking, or clanking, of the blade when supported by the trunnion of the invention.

FIG. 21B-1 illustrates a simplified side view of a blade retainer show in FIG. 7.

FIG. 21B2-illustrates a simplified end view of a blade retainer show in FIG. 7.

FIG. 21B-3 illustrates a simplified top view of a blade retainer show in FIG. 7.

FIG. 22 shows a pinned root which can be used to mount a blade to the trunnion, the outer part 50 of which is shown.

FIG. 23 schematically illustrates compression of the annular shelf 58 in FIG. 5 between bearings 70 and 75.

DETAILED DESCRIPTION OF THE INVENTION

Figure 4:
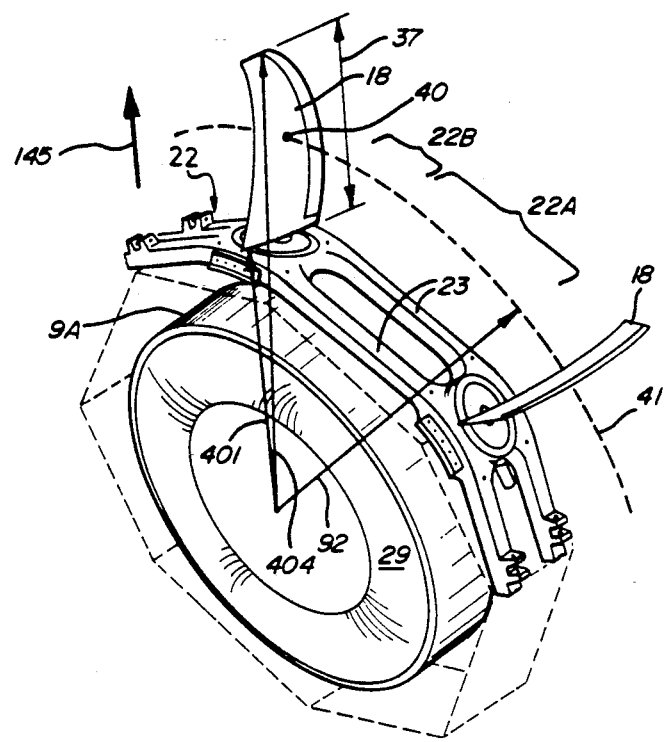
FIG. 4 illustrates schematically a polygonal ring 22 used to support the propeller blades 18.
Figure 4A:
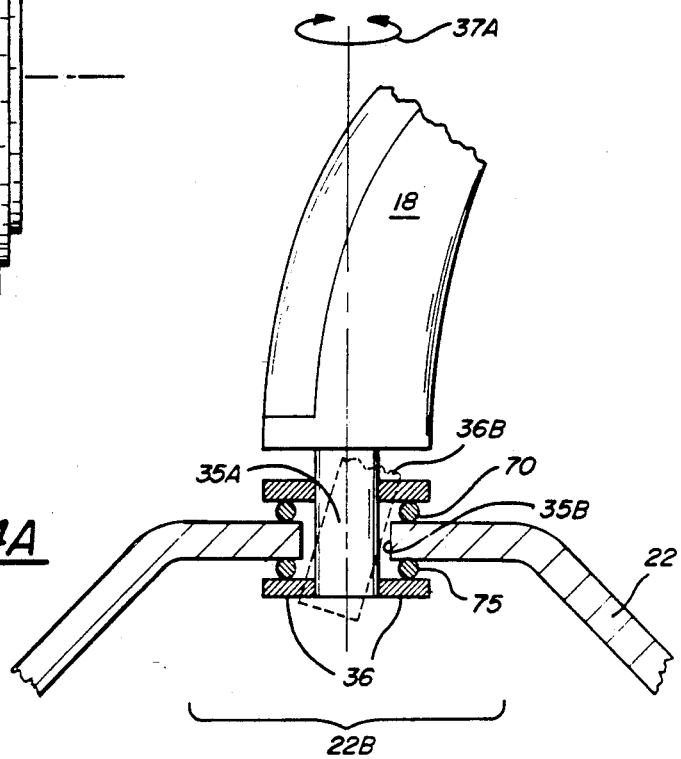
FIG. 4A illustrates one form of the invention.

A simplified form of the invention is shown in FIG. 4A, wherein a hollow shaft 35A extends through a hole 35B in a polygonal ring 22. The shaft connects to a propeller blade 18. A collar 36, which is larger in diameter than the hole 35B, prevents centrifugal force from driving the shaft 35A out of the hole. The collar 36 acts as an anchor. Alignment bearings 70 prevent the shaft from skewing into phantom position 36B under the influence of moments applied to the blade 18. Such moments can arise from the aerodynamic forces applied to the blade. Thrust bearings 75 react centrifugal force and allow pitch change of the blade, as indicated by arrow 37A.

Figure 1:
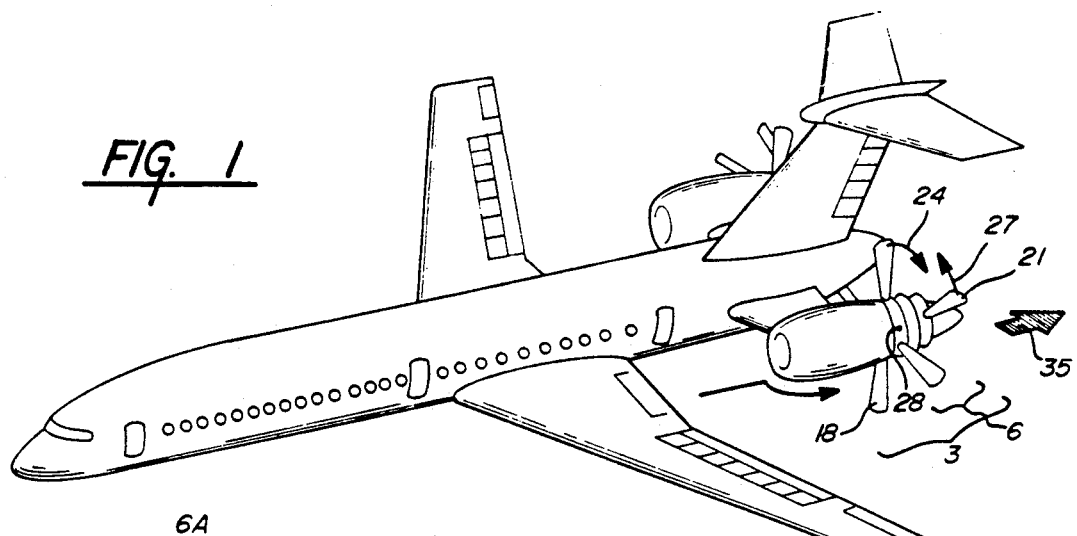
FIG. 1 illustrates an aircraft with which the invention can be used.

A more detailed form of the invention is shown in FIG. 6. The fan blades 18 in FIG. 1 are mounted to the polygonal ring 22 by trunnions 40 as shown in cross-section FIG. 6, and in exploded view in FIG. 5. The trunnions 40 are constructed in two parts, namely, a radially inner part 45 in FIG. 5 and a radially outer part 50. The two parts are threaded together by threads 55 in order to capture an annular shelf 58 between the two parts when assembled. The annular shelf 58 is fastened to the blade mounting section 22B of the polygonal ring 22. The trunnion can be disassembled by unthreading threads 55 in order to disassemble the trunnion, thereby releasing the annular flange and allowing removal of the propeller blade from the polygonal ring.

The threads 55 are of the buttress type, meaning that the angle A1 of one thread surface in FIG. 6A is different from the angle A2 of the other thread surface (A1 is 7 degrees, while A2 is 30 degrees), making the included angle, A3, 37 degrees. Further, the surfaces 60 making the seven degree angle with the pitch line 63 are those which abut each other when the trunnion 40 is assembled. The thread pitch is 12 threads per inch. The pitch diameter 61 in FIG. 6 is three inches.

Alignment bearings 70 and thrust bearings 75, shown in FIGS. 5 and 6, separate the trunnion from the blade mounting section 22B, and allow rotation for pitch change. The bearings ride in hardened races 80. (The inner trunnion part 45 contains one of the races 80 integrally formed therein, but such construction is not strictly necessary.)

During assembly, the two trunnion parts are threaded together until a predetermined amount of loading is applied to the alignment bearings 70 and the thrust bearings 75. The two trunnion parts are tightened together until the upper edge 77 in FIGS. 5 and 12 seats against abutment surface 78 in FIG. 12. However, random irregularities in size and shape of the components in FIG. 6 can cause improper loading. For example, if dimension 79 in FIG. 5 is too great, the inner and outer trunnion parts will not be drawn sufficiently close, causing the bearing pre-load to be inadequate.

Figure 12:
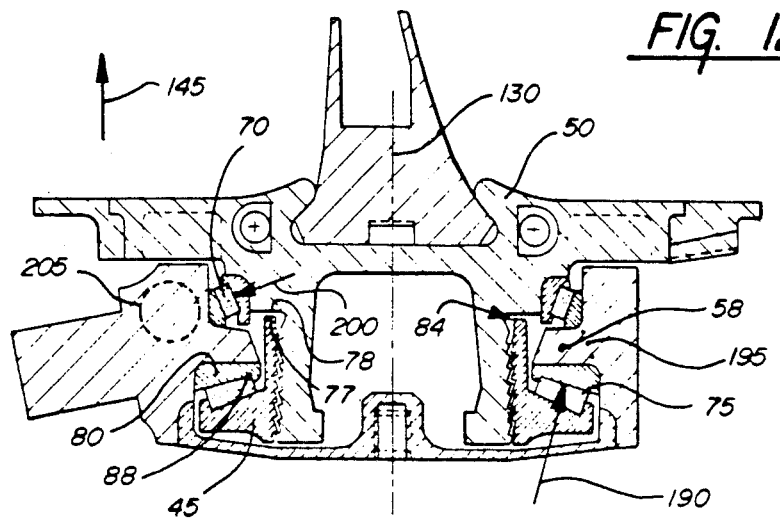
FIG. 12 is an alternative to FIG. 6.

In order to alter this situation, the components are measured, and shims 82 in FIG. 5 in the form of rings are placed between edge 77 and surface 78 in FIG. 12, that is, at the location indicated by arrow 84 in FIG. 12. A simplified measurement example will be given with reference to FIG. 12A. Distances 85 and 86 are measured as shown. When the parts are assembled, distance 85 will nearly equal distance 86. The shim is constructed such that (distance 85 minus distance 86) plus the shim thickness equals about 0.005 inches. That is, the shim takes up all but about 0.005 inches of the clearance between surfaces 77 and 78 in FIG. 12. Of course, it may occur that no shims are necessary.

Shims 82, in effect, decrease the loading on the bearings 70 and 75 when the edge 77 in FIG. 12 contacts the shim 82 and presses the shim against the surface 78. Restated, if no shim were installed when the relative distances 85 and 86 called for shims, then the pre-load on the bearings 70 and 75 would be too great when edge 77 met surface 78.

The trunnion parts are 45 and 50 are threaded together until a proper torque is attained. This torque serves to pre-load the bearings 70 and 75 in order to prevent separation of both the bearings from their respective races, and also to prevent separation of edge 77 from surface 78 in FIG. 12 under all conditions of engine operation as required to prevent thread failure.

Figure 3:
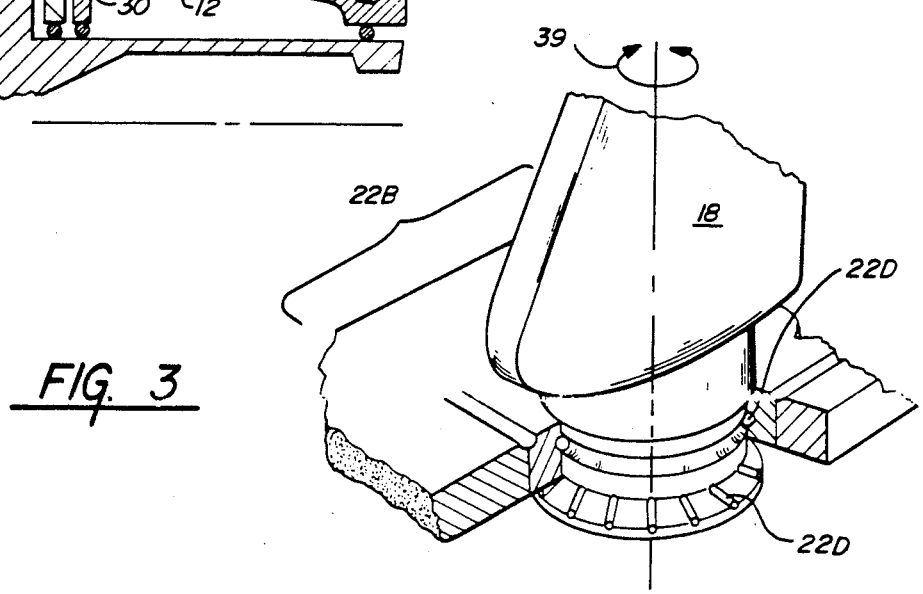
FIG. 3 illustrates schematically the mounting of an aircraft propeller blade 18 of FIGS. 1 and 2.
Figure 10:
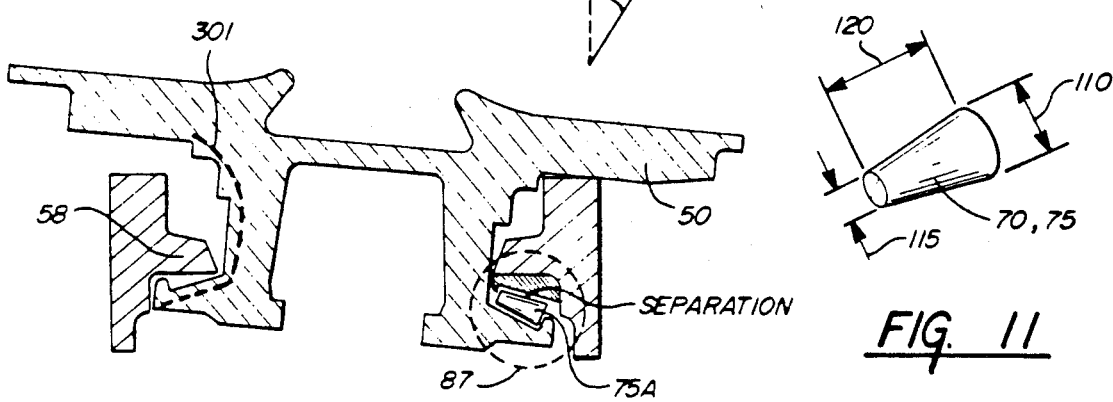
FIG. 10 is a simplified view of one form of the invention, showing skewing of trunnion part 50.

That is, if the bearings 70 and 75 had an improper pre-loading, then, when a moment is applied to the trunnion 40, as from the aerodynamic forces applied to the blade 18 in FIG. 3, the trunnion 40 can rotate and assume the skewed position shown in FIG. 10. This skewing separates bearings from their races, as shown by separated bearing 75A in dashed circle 87, which transfers the pressure formerly borne by the separated bearing 75A to the other bearings, which is undesirable. Further, the separation allows the bearings to chatter under some conditions of propeller operation, which is also undesirable. The pre-loading prevents this separation. Viewed another way, the pre-loading prevents axial movement, along pitch axis 130 in FIG. 6, of the trunnion 40 with respect to the blade mounting region 22B of the polygonal ring 22.

Figure 2:
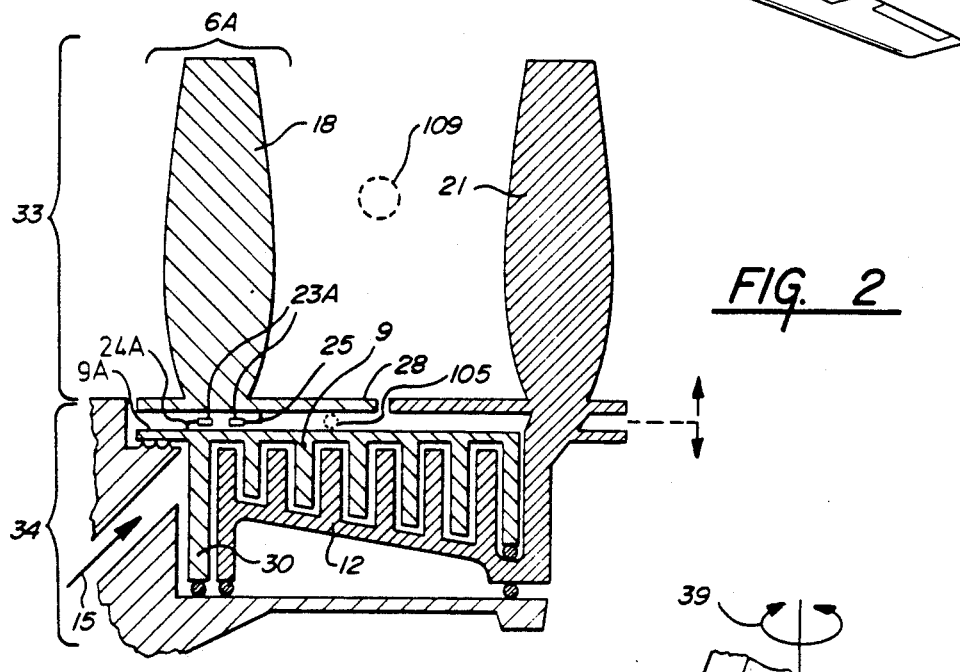
FIG. 2 is a cross-sectional view of region 6 in FIG. 1.

A dust cap 90 in FIGS. 5 and 6 fits onto the inner trunnion part 45 and inhibits entry of debris, as well as preventing airflow through the spaces 99 between the races 80. Airflow prevention can be desirable in cases when region 105 in FIGS. 2 and 6 is kept at a different pressure than region 109, as can occur when pressurized air is used to purge region 105 of volatile gases, such as lubricant vapors.

Several important features of the invention are the following:

1. The radially outer row of alignment bearings 70 in FIGS. 5 and 6 are of smaller diameter than the radially inner row of thrust bearings 75 because the inner row 75 reacts the thrust load imposed by centrifugal force acting on the blades. The centrifugal force is greater than the moment forces which the alignment bearings 70 react. For example, if each blade 18 and trunnion assembly 40 in FIG. 4 is assumed to behave as a point mass located at midpoint 40, weighing 50 pounds, and rotating in a circle 41 of three feet in radius (dimension 92), then the centrifugal load applied to each trunnion 40 is at least 50,000 pounds, computed as follows.

Centrifugal acceleration is equal to $w^2r$, wherein w is angular velocity, in radians per second, and r is radius. If propeller speed is 1200 rpm, which corresponds to 20 revolutions per second, then w equals 20 rev/sec $\times$ 2- $\times$ pi, or about 126 radians per second. Consequently, centrifugal acceleration is about 47,000 feet/second$^2$ ($126^2 \times 3$). Dividing this acceleration by the acceleration due to gravity, namely, 32.2 feet per second$^2$, gives the centrifugal acceleration in G's, which is about 1460 G's. Therefore, each blade and trunnion assembly, which was assumed to weigh 50 pounds when at rest, now applies a radially outward (i.e., in the direction of arrow 145 in FIGS. 4 and 12) force of about 73,000 pounds (i.e., 1460 $\times$ 50) to the thrust bearings 75 in the trunnion 40 because of centrifugal force. The force applied by the alignment bearings 70, in the outer row, is significantly less. Therefore, the outer bearings are smaller than the inner bearings because the load which they bear is smaller.

Figure 11:
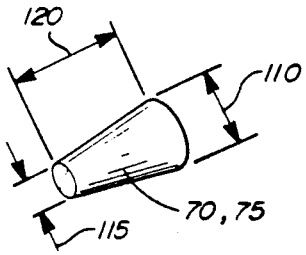
FIG. 11 illustrates a roller bearing of the type 70 and 75 of FIG. 6.

Both the outer bearings 70 and the inner bearings 75 are tapered roller bearings, as shown in FIG. 11. For the alignment bearings 70 which were tested by the inventors, the large diameter 110 is 0.205 inches, the small diameter 115 is 0.20 inches, and the length 120 is 0.35 inches. There are 70 bearings in the outer row, which is approximately 4.6 inches in diameter.

For the inner bearings 75 which were tested by the inventors, the large diameter 110 is 0.30 inches, the small diameter 115 is 0.22 inches, and the length 120 is 0.65 inches. There are 52 bearings in the inner row, which is approximately 4.6 inches in diameter.

Figure 9:
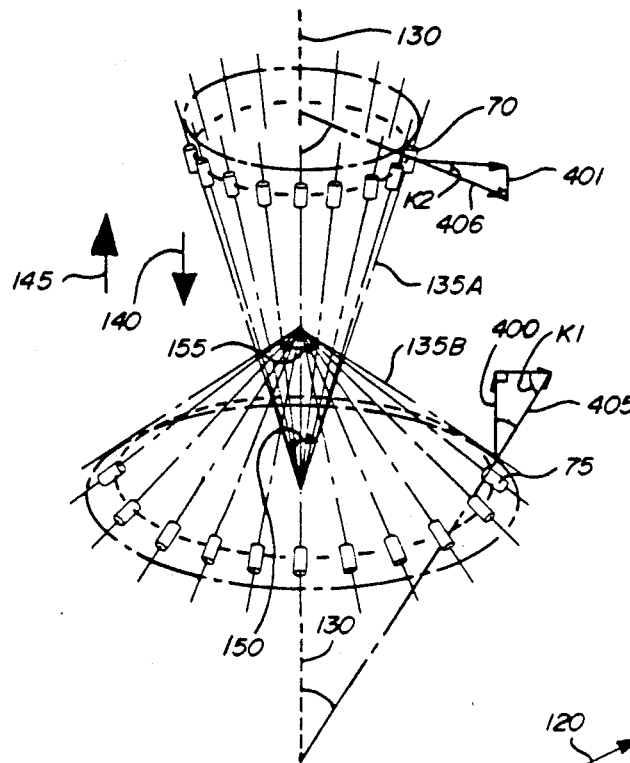
FIG. 9 is a schematic view of the arrangement of the bearings of FIG. 5.

2. The angles which each bearing row 70 and 75 make with the pitch axis 130 in FIG. 6 are different. As FIG. 9 shows, the axis 135 of each bearing in each row lies upon a cone. The axes 135A of the bearings 70 in the outer row lie on a first cone, while the axes 135B of those in the inner row 75 lie on a second cone. The first cone can be viewed as pointing radially inward, namely, in the direction of arrow 140, which is also shown in FIG. 5.

The second cone can be viewed as pointing radially outward, in the direction of arrow 145, which is opposite. The apex angle 150 of the first cone, upon which the axes 135A of the alignment bearings 70 lie, is less than the apex angle 155 of the second cone, upon which the axes 135B of the thrust bearings 75 lie. This difference in apex angle results because the thrust bearings 75 are closer to being aligned normal (i.e., perpendicular) with the centrifugal force vector (which is parallel with arrow 145) than are the alignment bearings 70.

These different orientations of the bearings have an effect on the force distribution applied to the polygonal ring 22. For example, even though the alignment bearings 70 are almost directly radially outward of the thrust bearings 75 in FIG. 6, as indicated by radius line 170, the forces applied to the ring by each type differ significantly.

The thrust load applied by the thrust bearings 75 in FIG. 12 is indicated by arrow 190, and it places the annular shelf 58 into shear: the thrust load tends to shear off the annular shelf 58 along dashed line 195. In contrast, the load of the alignment bearings 70 is indicated by arrow 200, and this load is borne predominantly as hoop stress by the region in phantom circle 205. This load-bearing region is annular about the pitch axis 130, as indicated dotted circle 220 in FIG. 5. The alignment bearings 70 cause primarily a hoop stress in the material at the periphery of the hole 225, while the thrust bearings cause primarily a shear load in the annular shelf 58.

3. A gear sector 230 in FIG. 5, which extends along only a sector of the trunnion 40, such as between points 240 and 245, is fastened to the trunnion 40 and is driven by a bevel gear 235 in order to change pitch. It is preferred that all blades 18 and 21 in FIG. 1 have identical pitch angles. However, it sometimes happens that minute manufacturing irregularities occur in the blades, giving neighboring blades different aerodynamic characteristics, even when they are driven to the same pitch. Further, gear lash and other small deviations from theoretical perfection in the mechanism which changes pitch can cause neighboring blades to acquire small deviations from identical pitch. These and other factors, which cause the pitch of the blades to differ from blade to blade, is called "pitch rigging error."

Pitch rigging error refers to the fact that the mechanism which positions the trunnions may not perfectly position all of them identically. It also refers to the fact that, even if all trunnions are positioned identically, there may be factors which cause different blades to be mounted differently on different trunnions. And it further refers to the fact that apparently identical blades can have minute differences which affect their aerodynamic performance.

Pitch rigging error causes different angles of attack to exist on different blades on the same propeller, thus causing the blades to produce different amounts of lift, which introduces vibration. The present invention reduces pitch rigging error by using a key resembling key 270 shown in FIG. 13. That figure shows trunnion part 50 and gear sector 230. Not only does the key 270 prevent relative movement between the trunnion part 50 and the gear sector 230, but the particular configuration of the key 270 allows one to select the relative position between the gear sector and the trunnion, thus affecting pitch angle, as will now be explained.

The actual shape of the key 270 is not necessarily that shown in FIG. 13, but may be closer to that shown in FIG. 14, wherein trunnion 40 and gear sector 230 are schematically shown. A bolt (not shown) fastens the key 270 to a hole 271 in the trunnion 40 through hole 273 in FIGS. 13 and 14, and the bolt is accessible through a hole 271A in gear sector 230.

The arrangement of FIG. 14 allows one to control the relative position of gear sector 230 with respect to trunnion part 50 by replacing the key 270 with another key of a different shape. For example, key 270 can be visualized as containing two components, 270A and 270B in FIG. 15. By first cutting the key 270 along line 274 in order to separate the two components 270A and 270B, and then sliding component 270A to the right with respect to component 270B, one can obtain the configuration of FIG. 16. It is preferred that the hole part 273C remain in its former position, that is, aligned with hole 271 in the trunnion 40 in FIG. 14. Otherwise, a new hole 271 (not shown) in the trunnion would be necessary.

When installed, the key 270 of FIG. 16 aligns the trunnion and gear sector as shown in FIG. 17, wherein the trunnion and sector are now displaced as compared with the situation of FIG. 14, as indicated by the non-alignment of reference marks 280 in FIG. 17 as compared with those marks in FIG. 14.

In actual practice, two components of the key 270 are not slid along each other as shown in FIGS. 15 and 16, but a group of different keys is made as shown in FIG. 18. Preferably, the keys are manufactured such that the distance 283, first, is not the same in any two keys and, second, distance 283 changes in increments which change distance 283A in FIG. 17 in increments of ¼ degree. That is, for example, twelve keys can be made such that any selected displacement (i.e., distance 283A in FIG. 17) from the following sequence can be selected: 0 degrees, ¼ degree, ½ degree, ... 2¾ degrees.

In another embodiment, the hole 271 is positioned in the trunnion in FIG. 14 such that the key 270 can be inverted, as shown in FIG. 19, in order to provide displacement of the gear sector 230 in the opposite direction. In FIG. 19, reference mark 280A is on the other side of mark 280B, as compared with the case of FIG. 17. Further, in still another embodiment, it may be desirable to remove material from the key 270 as indicated by dashed lines 290 in FIG. 18 in order to reduce weight. The edges of the key 270 may need to be chamfered, as indicated by cut 270G in FIG. 18, in order to accommodate fillets (not shown) existing in the trunnion or the gear sector. If chamfering is needed, and if the inversion feature just described is desired, then chamfering of all relevant edges must be done.

It is noted that surfaces 295 and 296 of the key 270 in FIG. 14 separate surfaces 297 and 298 of the trunnion and gear sector, respectively. That is, the key 270 acts to maintain surfaces 297 and 298 at selected positions with respect to a reference, which is the bolt hole 271 in the trunnion.

Viewed another way, the surfaces on the trunnion and the gear sector which contact the key, such as surfaces 295 and 296, act as anchor points in the sense that, once a given key has been selected and installed, these surfaces anchor the trunnion and the gear sector in the relative positions determined by the key. For example, if surface 297 were moved to phantom surface 297A, then the gear sector could slide in the direction of arrow 299 by a distance 299A. Gear sector 230 is thus not anchored in this example.

4. When the aircraft in FIG. 1 is parked on the ground, the wind can cause the propeller blades 18 and 21 to rotate, or "windmill." Windmilling causes the blades to rock, or "clank" in their dovetail mounts, because the fit is loose. Clanking can damage the blades. (The looseness causes no problem at operational speed because centrifugal force tightly jams the dovetail 250 in FIG. 6 into the dovetail slot 253, thus eliminating the loose fit.)

An anti-clank spring 307 in FIGS. 20A, 20B, and 20C is inserted into a slot 308 in FIG. 6 in the dovetail 250. The spring 307, in pushing the dovetail radially outward from the trunnion, in the direction of arrow 290, partially simulates the centrifugal load and locks the dovetail 250 into the slot 253. The spring 307, in FIG. 20B, is arched, in that ends 305 and 310 lie on the same line 315, but the midpoint 312 on the bottom surface 314 is separated from the line by a space 316. The spring 307 in FIG. 20A contains flanges 320 which are defined by cut-out regions 325, which have been removed in order to increase the flexibility of the spring. The flanges serve to align the spring 307 within the slot 308.

The spring is constructed such that a force of 450 pounds, indicated by arrow 329 in FIG. 20B, is applied to the dovetail 250 in FIG. 6.

In order to allow withdrawal of the spring 307, which is bound in the slot 308 in FIG. 6 by the 450-pound force, the spring contains a tapped, threaded hole 331 in a leg 333. The threaded hole 331 accepts a jacking screw 335 which can be driven against the dovetail 250 in order to withdraw the spring.

5. The blade 18 is fastened to the trunnion 40 by means of a dovetail 250 in FIG. 6.

A blade retainer 355, shown hatched in FIG. 7, and also shown in FIGS. 5, 21A, and 21B, is used to fasten the dovetail 250 in place, in order to prevent the dovetail 250 from sliding out of the the slot 253 in FIG. 6, in the direction of arrow 260 in FIG. 7. Two bolts 370 and 375, shown in FIGS. 6, 7, 21A, and 21B, fasten the retainer 355 in place. The retainer 355 also locks the leg 333 of the spring 307 against the dovetail and prevents the spring 307 from emerging from its slot 308 under the influence of vibration.

In addition, the bolts 370 and 375 react the impact load occurring when a bird strikes the propeller blade. A bird strike applies a force which is generally in the direction of arrow 270 in FIG. 7.

6. An attachment of blade 18 to trunnion 40 by means of a dovetail is not considered essential. Other types of fastening are available, such as a pinned root arrangement, as shown in FIG. 22. A pin 380 fastens two clevises 382. A pinned root can allow one to better control vibrational modes of the blade and reduce bending moments imparted to the trunnion 40.

7. The blade retention system of FIG. 5 can be viewed as comprising an annular flange captured within an annular groove. For example, the annular flange is the annular shelf 58 in FIG. 10, while the annular groove is indicated by bold dashed line 301. The bearings 70 and 75 (not all shown in FIG. 10) separate the annular flange from the annular groove.

8. The loadings applied to bearings 70 and 75 in FIG. 6 as the trunnion parts 45 and 50 are threaded together are not identical, partly because of the different angles 150 and 155 in FIG. 9 which each bearing axis makes with the pitch axis 130. The force applied by the threads 55 is generally parallel with the pitch axis 130, but the bearings 70 and 75 do not make the same angle with the pitch axis 130, and so the components of the force which are normal (i.e., perpendicular) to the bearings are not equal.

For example, if the bearings were parallel (i.e., angles 150 and 155 in FIG. 9 are equal at 180 degrees) as shown in FIG. 23, then threading the inner trunnion part 45 onto the outer trunnion part 50 will apply equal loads to the bearings. That is, the force 400 applied by the bearing 75 to the shelf 58 is opposed by an equal force 401 applied by bearing 70. Further, in applying the forces 400 and 401, each bearing 75 and 70 is subject to a compressive load of the same size as the respective forces.

When the apex angles are unequal, as in FIG. 9, the forces corresponding to forces 400 and 401 in FIG. 23 become forces 405 and 406, respectively, in FIG. 9. Force 405 is equal to the normal force, or loading, on the bearing 75. Force 405 equals force 400 divided by the sine of angle K1. Angle K1 equals one-half of angle 155 of the outward pointing cone.

Force 406, on alignment bearings 70, equals force 401 divided by the sine of angle K2. Angle K2 equals one-half of the apex angle 150 of the inward pointing cone. The pre-loading on the alignment bearings 70 will be greater than that on the thrust bearings 75 because the sine of angle K2 is less than that of angle K1. Of course, the relative pre-loadings also depends upon geometric factors, such as the relative distances 85 and 86 in FIG. 12. Further, relative pre-loading is not to be confused with relative centrifugal loading: the alignment bearings 70 in FIG. 9 experience virtually no centrifugal loading.

Figure 8:
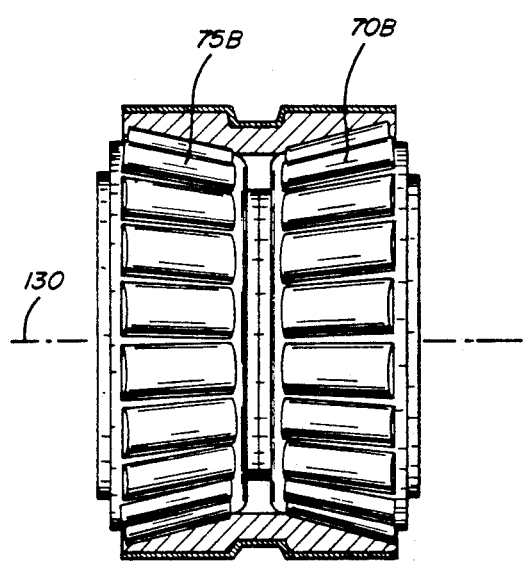
FIG. 8 is a type of dual roller thrust bearing.

9. Bearings 70 and 75 in FIG. 9 can be viewed as analogous to a pre-loaded thrust bearing pair 70B and 75B, as shown in FIG. 8. However, unlike the pair shown in FIG. 8, the axes of bearings 70 and 75 in FIG. 9 make unequal angles with the pitch axis 130. In contrast, the corresponding angles (not shown) in FIG. 8 are equal.

10. The invention has been described in connection with a ring 22 in FIG. 4 which surrounds a turbine 29. The turbine acts as a source of motive power for rotating the ring and the blades 18 attached to the ring. However, it is not necessary that the source of motive power be a turbine. Instead, a gearbox, or a type of rotor, may be the source of motive power for the ring.

11. The invention can be used when propeller blades, which are sometimes called fan blades, depending upon their aerodynamic characteristics, are supported by a ring, such as ring 22 in FIG. 4.

12. The alignment bearings 70 in FIGS. 5 and 6 function to maintain the trunnion 50 in a predetermined alignment with the pitch axis 130. The alignment bearings prevent wobble, or skew, of the trunnion 50. In some situations, the pitch axis 130 is an extension of a radius, similar to radius 401, of the polygonal ring 22 in FIG. 4. The pitch axis would then coincide with a radius, or extended radius, of the ring.

13. In the art, an array of bearings, such as bearings 70, is frequently called a row of bearings.

Numerous substitutions and modifications can be undertaken with regard to the embodiments disclosed herein without departing from the true spirit and scope of the invention as defined in the following claims.

What is desired to be secured by letters patent is the invention as defined in the following claims:

1. In a gas turbine engine with a plurality of variable pitch propulsor blades rotatable about a pitch axis, a rotatable blade retention system for supporting said plurality of propulsor blades upon a ring surrounding and driven by a source of motive power, comprising:
   a) a plurality of trunnions for supporting said propulsor blades, each trunnion fitting into said ring and comprising radially inner and outer trunnion parts, wherein
      i) said ring includes a blade mounting section having an opening with an annular shelf for receiving the trunnions therethrough, and
      ii) wherein said trunnions include buttress-type mating threads on the radially inner and outer parts for capturing the bearings and annular shelf therebetween to thereby permit removal of said inner and outer parts from the ring without disassembly of the ring;
   b) a plurality of alignment bearing rollers positioned between the outer trunnion part and an upper surface of said shelf;
   c) a plurality of thrust bearing rollers positioned between the inner trunnion part and a lower surface of said shelf;
   d) wherein said alignment bearing rollers and said thrust bearing rollers each
      i) separate the trunnion from the blade mounting section and allow for pitch-change rotation,
      ii) ride in hardened races,
      iii) comprise tapered roller bearings forming frustrums of cones, each of said frustrums of cones including a small end having a first diameter and a large end having a second diameter, wherein said first diameter of said thrust bearing rollers is approximately the same size as said first diameter of said alignment bearing rollers and wherein said second diameter of said thrust bearing rollers is larger than said second diameter of said alignment bearing rollers in order to accommodate blade centrifugal loads applied to said thrust bearing rollers which are significantly larger than loads applied to said alignment bearing rollers;
   e) sealing means for inhibiting pressurized air from escaping from a region near the source of motive power through openings in the ring;
   f) a pitch-change mechanism having a bevel drive gear wherein said trunnions include a gear sector along an inner portion of said radially outer part for engaging said bevel gear, and in response to movement of said bevel gear, changing the position of said trunnion and the pitch of said propulsor blades;
   g) means for correcting pitch-rigging-error in said propulsor blades, wherein said means for correcting pitch-rigging-error includes
      i) a plurality of keys which permit relative positioning between said trunnion radially outer part and said gear sector in controlled increments of $\frac{1}{4}$ degree in either direction;
      ii) a bolt which fastens a selected one of said keys to said trunnion radially outer part, said bolt passing through respective bolt holes in said selected key and said trunnion radially outer part;
      iii) wherein said selected key positions said trunnion radially outer part and said gear sector with respect to a reference comprising said trunnion radially outer part bolt hole;
      iv) wherein said bolt is accessible through a hole in said gear sector, thereby facilitating installation of said selected key; and
      v) means for positioning the alignment bearing rollers to have axes which lie approximately on the surface of a first cone, and positioning the thrust bearing rollers to have axes which lie approximately on the surface of a second cone, the first and second cones having different respective apex angles;
   h) said alignment rollers forming a first row making a first angle with the pitch axis and said thrust bearing rollers forming a second row making a second angle with said pitch axis wherein said first and second angles are different, wherein a load applied to the alignment bearing rollers is borne primarily as hoop stress in the ring and a load applied to the thrust bearing rollers is borne primarily as a shear load applied to the annular shelf.

2. In a gas turbine engine with a plurality of variable pitch propulsor blades rotatable about a pitch axis, a rotatable blade retention system for supporting said plurality of propulsor blades upon a ring surrounding and driven by a source of motive power, comprising:
  a) a plurality of trunnions for supporting said propulsor blades, each trunnion fitting into said ring and comprising radially inner and outer trunnion parts, wherein
    i) said ring includes a blade mounting section having an opening with an annular shelf for receiving the trunnions therethrough, and
    ii) wherein said trunnions include buttress-type mating threads on the radially inner and outer parts for capturing the bearings and annular shelf therebetween to thereby permit removal of said inner and outer parts from the ring without disassembly of the ring;
  b) a plurality of alignment bearing rollers positioned between the outer trunnion part and an upper surface of said shelf;
  c) a plurality of thrust bearing rollers positioned between the inner trunnion part and a lower surface of said shelf;
  d) wherein said alignment bearing rollers and said thrust bearing rollers each
    i) separate the trunnion from the blade mounting section and allow for pitch-change rotation,
    ii) ride in hardened races,
    iii) comprise tapered roller bearings forming frustrums of cones, each of said frustrums of cones including a small end having a first diameter and a large end having a second diameter, wherein said first diameter of said thrust bearing rollers is approximately the same size as said first diameter of said alignment bearing rollers and wherein said second diameter of said thrust bearing rollers is larger than said second diameter of said alignment bearing rollers in order to accommodate blade centrifugal loads applied to said thrust bearing rollers which are significantly larger than loads applied to said alignment bearing rollers;
  e) sealing means for inhibiting pressurized air from escaping from a region near the source of motive power through openings in the ring;
  f) a pitch-change mechanism having a bevel drive gear wherein said trunnions include a gear sector along an inner portion of said radially outer part for engaging said bevel gear, and in response to movement of said bevel gear, changing the position of said trunnion and the pitch of said propulsor blades;
  g) means for correcting pitch-rigging-error in said propulsor blades, wherein said means for correcting pitch-rigging-error includes
    i) a plurality of keys which permit relative positioning between said trunnion radially outer part and said gear sector in controlled increments of $\frac{1}{4}$ degree in either direction;
    ii) a bolt which fastens a selected one of said keys to said trunnion radially outer part, said bolt passing through respective bolt holes in said selected key and said trunnion radially outer part;
    iii) wherein said selected key positions said trunnion radially outer part and said gear sector with respect to a reference comprising said trunnion radially outer part bolt hole;
    iv) wherein said bolt is accessible through a hole in said gear sector, thereby facilitating installation of said selected key; and
    v) means for positioning the alignment bearing rollers to have axes which lie approximately on the surface of a first cone, and positioning the thrust bearing rollers to have axes which lie approximately on the surface of a second cone, the first and second cones having different respective apex angles;
  h) said alignment rollers forming a first row making a first angle with the pitch axis and said thrust bearing rollers forming a second row making a second angle with said pitch axis wherein said first and second angles are different, wherein a load applied to the alignment bearing rollers is borne primarily as hoop stress in the ring and a load applied to the thrust bearing rollers is borne primarily as a shear load applied to the annular shelf; and
  i) a dovetail connection between said trunnion radially outer part and the blade;
  j) spring means for simulating a centrifugal load on the blade, thereby reducing blade clanking when the gas turbine engine is inoperative, wherein said spring means includes a radial leg; and
  k) a blade retainer fixedly attached to said trunnion radially outer part with first and second retention bolts, wherein
    i) said blade retainer prevents said dovetail connection from sliding out of a slot in said trunnion radially outer part,
    ii) said blade retainer abuts said spring means radial leg, thereby locking said spring means against said dovetail connection and preventing said spring means from being dislodged due to vibration, and
    iii) said first and second retention bolts react impact loads such as those which occur when a bird strikes the propulsor blades.

* * * * *